United States Patent Office 3,275,635
Patented Sept. 27, 1966

3,275,635
CERTAIN 2-BENZENESULFONAMIDE-5-ALKYL (OR ALKOXY) PYRIMIDINE COMPOUNDS
Hans Priewe, Berlin-Steglitz, and Klaus Gutsche, Berlin-Grunewald, Germany, assignors to Schering, A.G., Berlin, Germany
No Drawing. Filed Oct. 12, 1961, Ser. No. 144,530
Claims priority, application Germany, Oct. 18, 1960, Sch 28,634; Feb. 22, 1961, Sch 29,273; Feb. 23, 1961, Sch 29,280
7 Claims. (Cl. 260—256.5)

This invention relates to compounds capable of lowering the blood sugar level in warm blooded animals, and more particularly to sulfonamide compounds capable of such a physiological effect.

Sulfonamide compounds which lower the blood sugar level and are suitable for the treatment of diabetes mellitus have been known for about two decades. Some compounds of the sulfonamide type have found general acceptance for this purpose. We now have found a new group of sulfonamide compounds which compare favorably in their blood sugar level depressing effect and their low toxicity with the best known physiologically effective sulfonamide agents. The sulfonamide compounds of this invention are effective when administered orally, their effects are relatively long-lasting, and their toxicity is low. The toxicity of some of our novel compounds is lower than that of the best heretofore available blood sugar level depressants which makes them particularly valuable for long term application.

The novel compounds of the invention have the general formula

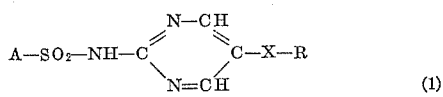

(1)

wherein A is a phenyl radical which may carry one or two side substituents but should not be linked to a nitrogen atom in the para-position. A may also be a saturated or unsaturated hydrocarbon radical having a straight, branched, or cyclic carbon chain, or a carbon chain interrupted by one or more interposed oxygen atoms. X is either a bond between adjacent carbon atoms or an oxygen atom, and R is a saturated or unsaturated hydrocarbon radical which may have a straight, branched, or cyclic carbon chain, or a carbon chain interrupted by one or more interposed oxygen atoms.

The compounds of the invention may be prepared by several methods such as the following:

METHOD I

Compounds of the formulas $$A—SO_m—Hal \text{ and } (A—SO_2—)_2O \quad (2)$$

wherein Hal is a halogen, and m is an integer between 0 and 2, are reacted with a 2-amino-5-X—R-pyrimidine. A and X—R represent the same radicals as in Formula 1. The reaction product may have to be oxidized to the sulfonic acid derivative when m is smaller than 2.

METHOD II

A sulfonamide compound of the formula $$A—SO_2—NH_2 \quad (3)$$

preferably in the form of its alkali metal salt, is reacted with a 2-halogeno-5-X—R-pyrimidine.

METHOD III

An alkali metal salt of an amide of the formula $$A—SO_2—NH_2 \quad (3)$$

is reacted with a 2-trialkylammonium-5-X—R-pyrimidine salt.

METHOD IV

A compound of the formula

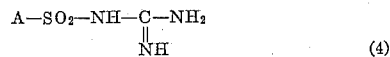

(4)

is condensed to form a cyclic structure with a compound of the formula

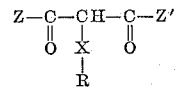

wherein Z and Z' are each either hydrogen or an alkoxy radical. If Z or Z' is hydrogen, and the compound therefore is an aldehyde, a corresponding reactive aldehyde derivative may be employed as the starting material. If the reaction product carries hydroxyl groups in positions 4 and/or 6 of the pyrimidine ring, these groups are replaced by hydrogen in the usual manner.

METHOD V

A sulfonamide of the formula

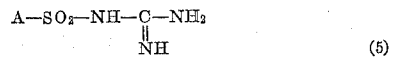

(5)

is reacted with a product obtained by the Vilsmeier reaction from a 1,1-dialkoxy-2-X—R-ethane or a 1-X—R-2 alkoxy ethylene with an N,N-disubstituted formamide in the presence of the chloride of an inorganic acid such as phosphorus pentachloride or phosgene. If X—R in the 1,1-dialkoxy-2-X—R-ethane or the 1-X—R-2 alkoxy ethylene is an alkoxy radical, the other alkoxy radicals may be the same as X—R. The Vilsmeier reaction product may, for example, be β-dialkylamino-α-X—R-acroleine and may be used as its acetal. The aforementioned sulfonamide may also be reacted with a β-alkoxy-α-X—R-acroleine or its acetal, or with β-chloro-α-X—R-acroleine or its acetal.

METHOD VI

A sulfonamide of the formula $$A—SO_2—NH_2 \quad (3)$$

is reacted with a 2-nitroamino- or 2-cyanamino-5-X—R-pyrimidine.

METHOD VII

A sulfonic acid of the formula $$A—SO_2—OH \quad (6)$$

is reacted according to Freudenberg's method with a 2-acetylamino-5-X—R-pyrimidine.

METHOD VIII

A sulfonyl halide of the formula $$A—SO_2—Hal \quad (7)$$

is reacted with a 2-benzylsulfonylamido-5-X—R-pyrimidine according to the method of French Patent No. 891,-

930. The reaction product is further reacted with an equimolecular amount of the corresponding 2-aminopyrimidine.

It will be understood that A and X—R in the Methods II to VIII represent the same radicals as in Formula 1.

METHOD IX

The aminopyrimidine derivatives employed, for example, in Method I are preferably prepared by reacting a 1,1-dialkoxy-2-X—R-ethane derivative of the formula

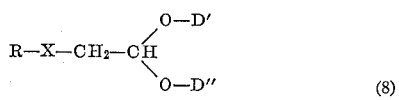
(8)

wherein D′ and D″ are lower alkyl radicals with an acidic halogen bearing condensation agent suitable for the Vilsmeier reaction, such as phosphorus pentachloride, so as to replace one of the alkoxy radicals in Formula 8, and reacting the compound formed with a formamide of a secondary amine of the formula

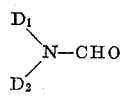
(9)

which is added either simultaneously with the Vilsmeier condensation agent or thereafter, and wherein $D_1$ is an alkyl radical, and $D_2$ is an alkyl or phenyl radical. A preferred example of an amine of Formula 9 is dimethyl formamide. The thus obtained Vilsmeier condensation reaction product is then reacted with a solution of a guanidine salt in the presence of an alkali metal hydroxide or of an alkali metal alcoholate dissolved in a lower alkanol.

The following examples are further illustrative of the present invention, and it will be understood that the invention is not limited thereto:

Example 1

210 g. phosphorus pentachloride are gradually added to 252 g. methoxyethoxyacetaldehyde-di-methoxyethylacetal with agitation. The mixture is externally cooled with ice to hold the reaction temperature below 25° C. Moisture is carefully excluded. After addition of the condensation agent is completed, the reaction mixture is further agitated at room temperature for 30 minutes. 225 ml. dimethylformamide are then added drop by drop while the reaction temperature is held at 20 to 25° C. by external cooling of the reaction vessel with ice. When the dimethylformamide has been added, the temperature is raised to 60° C., and this temperature is maintained for 70 minutes.

The temperature is again lowered to 20–25° C. and maintained at this value by cooling with ice while 500 ml. methanol are added drop by drop. The resulting solution is admixed drop by drop to a suspension of 240 g. powdered caustic soda in 800 ml. methanol at 20 to 25° C. After mixing is completed, stirring is continued for 30 minutes at room temperature. The solution now contains inorganic salts and β-dimethylamino-α-methoxyethoxyacroleine.

200 g. guanidine nitrate and thereafter 70 g. sodium hydroxide are added to the solution. The methanol is evaporated with agitation. The residue is dissolved in 1.5 liters water and is repeatedly extracted with chloroform. The combined chloroform extracts are evaporated to dryness, and the residue is recrystallized from carbon tetrachloride. 80 grams of 2-amino-5-methoxyethoxypyrimidine of M.P. 80–81° C. are obtained.

Example 2

324 g. 1,1,2-tricyclohexyloxyethane when subjected to the sequence of steps of Example 1 instead of methoxyethoxyacetaldehyde-di-methoxyethylacetal yield 88 g. 2-amino-5-cyclohexyloxypyrimidine of M.P. 72–73° C.

Example 3

430 g. ethoxyethoxyethoxyacetaldehyde - di - ethoxyethoxyethylacetal are reacted with phosphorus pentachloride, dimethylformamide, and guanidine nitrate in the same manner as set forth in Example 1. The crude base obtained by the chloroform extraction is dissolved in dilute hydrochloric acid and the acid solution is repeatedly extracted with ether. The aqueous phase is made alkaline with sodium hydroxide and is extracted with chloroform. The chloroform extract is evaporated and 175 g. 2-amino-5-ethoxyethoxyethoxypyrimidine are obtained as a brown oil.

The base is transformed for identification into the corresponding benzenesulfonyl compound of M.P. 118–119° C. by reaction with benzenesulfochloride in pyridine solution.

Example 4

330 g. tetrahydrofurfuryloxyacetaldehyde-di-tetrahydrofurylacetal when subjected to the reaction sequence of Example 3 yield 130 g. 2-amino-5-tetrahydrofurfuryloxypyrimidine which is a brown oil. The corresponding benzenesulfonyl derivative melts at 213–215° C.

In an analogous manner there are prepared 2-amino-5-X–R-pyrimidines wherein X–R represents the following radicals: Methoxyethoxy, methyl, n-propoxy-, ethyl, ethoxy, methoxy-methyl, ethoxymethyl, isopropoxy, and isobutoxy.

The guanidine nitrate mentioned in Examples 1 to 4 may be replaced by another guanidine salt which reacts as the free guanidine base in an alkaline medium.

Example 5

15 g. calcium carbonate and 20 g. toluenesulfochloride are added to a solution of 12.5 g. 2-amino-5-methoxypyrimidine in 100 ml. water. The mixture is gradually heated to 80° C. within 30 minutes, and held at that temperature for two hours while it is being agitated. At the end of this period, the toluenesulfochloride is no longer visible as a separate phase. 20 ml. 30% sodium hydroxide solution are added, and the solution is clarified by the addition of charcoal and filtering. Upon addition of concentrated hydrochloric acid 21.5 g. 2-(4-methylbenzenesulfonamido)-5-methoxypyrimidine of M.P. 196–197° C. are obtained.

Example 6

15.3 g. 2-amino-5-n-propoxypyrimidine are dissolved in 60 ml. pyridine and are agitated jointly with 19 g. toluenesulfochloride for two hours at 60° C. The solution obtained is poured into 300 ml. water. The precipitate formed is filtered and washed with water. The insoluble material is dissolved in 300 ml. N sodium hydroxide, and charcoal is added to the resulting solution which is then filtered. A precipitate formed in the filtrate by the addition of hydrochloric acid is 2-(4-methylbenzenesulfonamido)-5-n-propoxy-pyrimidine of M.P. 198–200° C. The yield is 29 grams.

Example 7

A mixture of 18 g. of the sodium salt of 4-methoxybenzenesulfonamide and 14.5 g. 2-chloro-5-methoxypyrimidine is finely ground and heated with agitation for four hours to 140° C. A homogeneous melt is formed. It solidifies on cooling and is dissolved in 300 ml. N sodium hydroxide solution. The solution is purified by the addition of charcoal and filtering. 23.5 g. 2-(4-methoxybenzenesulfonamido)-5-methoxypyrimidine of M.P. 153–154° C. are precipitated from the filtrate by the addition of concentrated hydrochloric acid.

Example 8

18 g. of the sodium salt of 4-methoxybenzenesulfonamide and 31 g. of the quaternary compound of methyl iodide with 2-dimethylamino-5-ethoxypyrimidine are refluxed eight hours in 200 ml. anhydrous toluene with agitation. The reaction mixture is cooled to room temperature. The precipitate formed is filtered off with suction, permitted to dry in air, and dissolved in 300 ml. N sodium hydroxide solution. The solution is treated with charcoal, filtered and acidified with concentrated hydrochloric acid. The precipitate formed upon acidification consists of 23 g. 2-(4-methoxy-benezenesulfonamido)-5-ethoxypyrimidine of M.P. 198–200° C.

Example 9

12.9 g. β-dimethylamino-α-methoxyacroleine are dissolved in 150 ml. methanol. 5.5 g. powdered sodium hydroxide and 20 g. p-toluenesulfoguanidine are added. The mixture is refluxed with agitation for 8 hours. The methanol is then evaporated while agitation is continued. The residue is dissolved in 300 ml. N sodium hydroxide solution. The solution is purified with charcoal and filtered. Upon acidification with hydrochloric acid, 21 g. 2-(4-methylbenzenesulfonamido)-5-methoxypyrimidine of M.P. 196–197° C. are obtained.

Example 10

12 g. 1,1,2-trimethoxyethane are mixed with 21 g. phosphorus pentachloride. The reaction mixture is kept at a temperature of 22 to 25° C. by cooling. The mixture is stirred for 30 minutes at room temperature, whereafter 22.5 ml. dimethylformamide are added drop by drop while the mixture is being cooled to 20–25° C. After the addition of dimethylformamide is completed, the mixture is heated to 40° C. whereby an exothermic reaction is started. The temperature is held for 75 minutes at 60° C. The reaction mass is then permitted to cool, and 50 ml. methanol are added drop by drop while room temperature is maintained.

The solution formed is gradually admixed at 20 to 25° C. to a suspension of 24 g. powdered sodium hydroxide in 80 ml. methanol, and the mixture obtained is stirred for 30 minutes. It now contains inorganic salts and β-dimethylamino-α-methoxyacroleine. The latter is further reacted by the addition of 20 g. toluenesulfoguanidine and refluxing of the solution for eight hours with agitation. The reaction mixture is worked up in a manner analogous to the procedure of Example 9. The compound obtained is recrystallized from acetone. 18.2 g. 2-(4-methylbenzenesulfonamido)-5-methoxypyrimidine of M.P. 196–197° C. are obtained.

Example 11

25 g. 2-amino-5-methoxypyrimidine are dissolved in 250 ml. anhydrous benzene. A solution of 16 g. p-toluenesulfenylchloride in 150 ml. benzene is added drop by drop with cooling. The completed mixture is stirred 30 minutes at 30° C. Upon cooling to room temperature crystals are precipitated. They are filtered off with suction and permitted to dry in air. The dry crystals are stirred with 100 ml. water and filtered by means of suction to remove coprecipitated 2-amino-5-methoxypyrimidine hydrochloride. The moist solid on the filter is dissolved in 300 ml. glacial acetic acid and is oxidized in the solution by the addition of 60 ml. 30% hydrogen peroxide. Oxidation is complete after 12 hours, and the solution is evaporated in a vacuum to a volume of 100 ml. Upon dilution with 300 ml. water a crystalline precipitate is formed which is filtered off and recrystallized from 50% acetone.

21.5 g. 2-(4-methylbenzenesulfonamido)-5-methoxypyrimidine of M.P. 196–197° C. are obtained.

Example 12

25 g. 2-amino-5-methoxypyrimidine are dissolved in 300 ml. benzene, and the solution is added at 5° C. to 22 g. toluenesulfinyl chloride dissolved in 100 ml. benzene. The mixture is stirred two hours at room temperature. A mixture of 2-(4-methylbenzenesulfinamido)-5-methoxypyrimidine and 2-amino-methoxypyrimidine hydrochloride is precipitated. The precipitate is filtered off, digested with water and oxidized in the same manner as described in Example 11. The yield is 23 g. 2-(methylbenzenesulfonamido)-5-methoxypyrimidine of M.P. 196–197° F.

Example 13

17.7 g. 2-amino-5-cyclohexyloxypyrimidine are dissolved in 60 ml. pyridine. 17 g. benzenesulfochloride are added and the resulting mixture is heated two hours to 60° C. It is then poured into 300 ml. water. The precipitate formed thereby is filtered off and dissolved in dilute ammonium hydroxide. The solution is purified with charcoal, and filtered. The filtrate is acidified with acetic acid. 30 g. 2-benzenesulfonamido-5-cyclohexyloxypyrimidine of M.P. 225–226° C. are obtained.

Example 14

12.5 g. 2-amino-5-methoxypyrimidine are dissolved in 60 ml. pyridine and mixed with 17 g. isoamylsulfochloride. The mixture is stirred for three hours at room temperature, and then poured into 300 ml. water. The precipitate formed is filtered off, washed with water, and dissolved in dilute ammonium hydroxide solution. The solution so obtained is clarified by addition of charcoal and filtration. 20 g. 2-isoamylsulfonamido-5-methoxypyrimidine are precipitated from the filtrate by the addition of acetic acid, M.P. 163–165° C.

Example 15

12.5 g. 2-amino-5-methoxypyrimidine are dissolved in pyridine and the solution is stirred with 18 g. ethoxyethylsulfochloride for three hours at room temperature. The pyridine is distilled off in vacuo and the residue is stirred with 200 ml. water for one hour. The insoluble material is filtered off and purified by reprecipitation from dilute ammonium hydroxide solution with acid. 20 g. 2-ethoxyethylsulfonamido-5-methoxypyrimidine of M.P. 124–125° C. are obtained.

Example 16

21 g. cyclohexylsulfoguanidine of M.P. 291° C. are prepared in a conventional manner from guanidine and cyclohexylsulfochloride. The cyclohexylsulfoguanidine and 6 g. sodium methylate are added to a solution of 13 g. β-dimethylamino-α-methoxyacrolein in 250 ml. methanol. The mixture is distilled off. The residue is dissolved in water, and the aqueous solution is acidified with acetic acid. The precipitate formed thereby is filtered off by means of suction, washed with water, and dissolved in dilute ammonium hydroxide solution. The ammoniacal solution is purified by addition of charcoal and filtration, and acidified with acetic acid. 2-cyclohexylsulfonamido-5-methoxypyrimidine is precipitated. The yield is 22 g., the melting point 231–235° C.

Example 17

14 g. isoamylsulfenyl chloride dissolved in 100 ml. anhydrous ether are added drop by drop to a solution of 25 g. 2-amino-5-methoxypyrimidine in 300 ml. anhydrous ether. The reaction mixture is stirred for 30 minutes while it is being kept at its boiling point. A mixture of 2-isoamylsulfeneamido-5-methoxypyrimidine and 2-amino-5-methoxypyrimidine hydrochloride is precipitated. The precipitate is digested with 100 ml. water and filtered. The solid fraction is dissolved in 200 ml. glacial acetic acid and oxidized by the addition of 60 ml. 30% hydrogen peroxide. After 24 hours standing at room temperature, the solution is evaporated to a volume of about 50 ml. and then diluted with 200 ml. water. A crystalline precipitate of 2-isoamylsulfonamido-5-methoxypyrimidine is formed which is filtered off and recrystallized from 50% ethanol. The yield is 12 g., the melting point 163–165° C.

Example 18

25 g. 2-amino-5-ethoxypyrimidine are dissolved in 200 ml. anhydrous ether and are mixed at 5° C. with a solution of 15 g. isoamylsulfinyl chloride in 100 ml. anhydrous ether. The mixture is stirred for two hours at room temperature. The precipitate formed is filtered off and oxidized with hydrogen peroxide as described in Example 13. The sulfonamide derivative obtained is recrystallized from 50% acetone. There are obtained 14 g. isoamylsulfonamido-5-ethoxypyrimidine of M.P. 170–172°.

Example 19

20 g. isoamylsulfoguanidine of M.P. 198° C. are prepared by reacting guanidine with isoamylsulfochloride. The isoamylsulfoguanidine is heated with 12 g. sodium methylate and 16 g. of the dimethyl ester of methoxymalonic acid in 200 ml. methanol for four hours in an autoclave to 110° C. Upon cooling of the reaction mixture, the methanol is evaporated and the residue is dissolved in 200 ml. water. When the aqueous solution is acidified with hydrochloric acid, 25 g. 2-isoamylsulfonamido - 4,6 - dihydroxy-5-methoxypyrimidine are obtained. The precipitated compound is refluxed without further purification with 150 ml. phosphorus oxychloride for 30 minutes. The excess of phosphorus oxychloride is distilled off in a vacuum. The residue is poured on ice and stirred therewith for one hour. The aqueous solution obtained is purified by treatment with charcoal and filtration. The filtrate is adjusted to a pH value of 4–5 by the addition of sodium acetate, and further stirred for about two hours. 2-isoamylsulfonamido - 4,5-dichloro-5-methoxypyrimidine is precipitated, filtered off, and dissolved in 300 ml. N sodium hydroxide solution. The solution is agitated with 20 g. zinc dust for two hours at 90° C. Upon completion of the reduction, the mixture is filtered while still hot to remove the insoluble zinc salts. The filtrate is acidified with acetic acid and 18 g. 2-isoamylsulfonamido-5-methoxypyrimidine are obtained. The melting point is 163–165° C. after recrystallization from 50% ethanol.

The reduction of the dichloropyrimidine derivative may also be performed in methanol solution in the presence of an acid binding agent such as calcium carbonate by hydrogenation of the dichloropyrimidine derivative in the presence of a palladium catalyst.

Table I lists additional sulfonamide derivatives which are prepared by the methods described above. The first column of the table refers to one of the preceeding examples in which the method employed for preparing an analogous sulfonamide compound is described in detail. The second and third columns respectively identify the additional sulfonamide compound by the substituents A and X—R in the following formula:

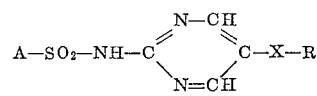

and the fourth column lists the melting point in degrees centigrade.

TABLE I

| Method of Ex. | A | X—R | M.P., °C. |
|---|---|---|---|
| 6 | H₃C—⌬— | —OC₂H₅ | 201–203 |
| 6 | H₃C—⌬— | —OCH(CH₃)₂ | 208–209 |
| 6 | H₃C—⌬— | —O-n-C₄H₉ | 180–183 |
| 6 | H₃C—⌬— | —CH₃ | 256–260 |
| 6 | H₃CO—⌬— | —CH₃ | 235–240 |
| 66 | H₃C—⌬— | —C₂H₅ | 218–219 |
| 6 | H₃CO—⌬— | —C₂H₅ | 194–195 |
| 6 | Cl—⌬— | —OCH₃ | 183–184 |
| 6 | Cl—⌬— | —OC₂H₅ | 184–185 |
| 6 | Cl—⌬— | —O-n-C₃H₇ | 188–190 |
| 6 | Cl—⌬— | —OCH(CH₃)₂ | 196–200 |
| 6 | ⌬— | —OCH₃ | 172–174 |
| 6 | ⌬— | —OC₂H₅ | 175–176 |
| 6 | ⌬— | —O-n-C₃H₇ | 184–185 |

TABLE I—Continued

| Method of Ex. | A | X—R | M.P., °C. |
|---|---|---|---|
| 6 | H₃CO—C₆H₄— | —OCH(CH₃)₂ | 185–186 |
| 6 | H₃CO—C₆H₄— | —O-n-C₄H₉ | 183–185 |
| 6 | H₃C—C₆H₄— | -n-C₃H₇ | 197–199 |
| 6 | H₃C—C₆H₃(CH₃)— | —OC₂H₅ | 210–212 |
| 6 | F—C₆H₄— | —O-n-C₄H₉ | 168–169 |
| 6 | F—C₆H₄— | —O—CH₂—CH(CH₃)₂ | 205–207 |
| 6 | Cl—C₆H₃(CH₃)— | —O—CH₂—CH(CH₃)₂ | 166–168 |
| 6 | Cl—C₆H₃(CH₃)— | —OC₂H₅ | 204–208 |
| 6 | Cl—C₆H₃(CH₃)— | —OCH₃ | 206–210 |
| 6 | H₃C—C₆H₄— | —O—CH₂—CH(CH₃)₂ | 220–224 |
| 6 | H₃C—C₆H₃(CH₃)— | —OCH(CH₃)₂ | 134–137 |
| 6 | F—C₆H₄— | —CH₃ | 233–234 |
| 6 | Cl—C₆H₃(CH₃)— | —C₂H₅ | 183–185 |
| 7 | n-C₄H₉ | —OCH₃ | 138–140 |
| 8 | n-C₄H₉ | —OC₂H₅ | 160 |
| 13 | H₃C—C₆H₄— | —O—C₆H₁₁ | 217–220 |
| 13 | H₃C—C₆H₄— | —CH₂.OC₂H₅ | 160 |
| 13 | C₆H₅— | —OC₂H₄.O.CH₃ | 152–154 |
| 13 | Cl—C₆H₄— | —OC₂H₄.OCH₃ | 199–201 |
| 13 | Cl—C₆H₄— | —CH₂—O—CH₃ | 192–193 |
| 13 | H₃C—C₆H₄— | —CH₂—O.CH₃ | 198–201 |
| 13 | H₃C—C₆H₄— | —O—C₂H₄.OCH₃ | 165 |

TABLE I—Continued

| Method of Ex. | A | X—R | M.P., °C. |
|---|---|---|---|
| 13 | phenyl | —OC$_2$H$_4$.OC$_2$H$_4$.OC$_2$H$_5$ | 118–119 |
| 13 | phenyl | —O.CH$_2$-(tetrahydrofuranyl) | 213–215 |
| 14 | i-C$_5$H$_{11}$— | —OC$_2$H$_5$ | 170–172 |
| 14 | i-C$_5$H$_{11}$— | —OC$_3$H$_7$(n) | 154 |
| 14 | n-C$_4$H$_9$— | —O—CH$_2$—CH(CH$_3$)$_2$ | 143–145 |
| 14 | CH$_2$=C(CH$_3$)—CH$_2$— | —OCH$_3$ | 144–147 |
| 14 | CH$_2$=C(CH$_3$)—CH$_2$— | —OC$_3$H$_7$(n) | 117–119 |
| 14 | CH$_2$=C(CH$_3$)—CH$_2$— | —OC$_2$H$_5$ | 152–155 |
| 14 | (tetrahydrofuranyl)-CH$_2$— | —OCH$_3$ | 155 |
| 14 | (tetrahydrofuranyl)-CH$_2$— | —O—CH$_2$—CH(CH$_3$)$_2$ | 104–105 |
| 15 | C$_2$H$_5$·O·C$_2$H$_4$— | —CO$_2$H$_5$ | 107–108 |
| 15 | C$_2$H$_5$·O·C$_2$H$_4$— | —OC$_3$H$_7$(n) | 87–89 |
| 15 | C$_2$H$_5$·O·C$_2$H$_4$— | —O—CH$_2$·CH(CH$_3$)$_2$ | 94–95 |
| 15 | C$_3$H$_7$·O·C$_2$H$_4$— | —OC$_2$H$_5$ | 112–114 |
| 15 | C$_2$H$_5$·O·C$_2$H$_4$— | —OCH(CH$_3$)$_2$ | 71–73 |
| 15 | C$_2$H$_5$·O·C$_2$H$_4$·O·C$_2$H$_4$— | —OCH$_3$ | 88–90 |
| 15 | C$_2$H$_5$·O·C$_2$H$_4$·O·C$_2$H$_4$— | —OC$_2$H$_5$ | 82–84 |
| 15 | n-C$_3$H$_7$·O·C$_2$H$_4$— | —OCH$_3$ | 111–113 |
| 15 | (CH$_3$)$_2$CH—O—C$_2$H$_4$— | —OCH$_3$ | 125–126 |
| 15 | i-C$_5$H$_{11}$— | —OCH$_3$ | 160–162 |
| 15 | C$_2$H$_5$O—(C$_2$H$_4$O)$_2$—C$_2$H$_4$— | —OCH$_3$ | 119–121 |
| 15 | C$_2$H$_5$O—(C$_2$H$_4$O)$_2$—C$_2$H$_4$— | —OC$_2$H$_5$ | 80–83 |
| 15 | i-C$_5$H$_{11}$— | —O-cyclohexyl | 129–131 |
| 15 | C$_2$H$_5$O·C$_2$H$_4$O·C$_2$H$_4$— | —O-cyclohexyl | 85–87 |
| 15 | i-C$_5$H$_{11}$— | —CH$_3$ | 123–125 |
| 15 | n-C$_4$H$_9$·O·C$_2$H$_4$·O·C$_2$H$_4$— | —OCH$_3$ | 68–69 |
| 15 | i-C$_3$H$_7$·O·C$_2$H$_4$·O·C$_2$H$_4$— | —OCH$_3$ | 90 |
| 14 | (tetrahydrofuranyl)-CH$_2$— | —OC$_2$H$_5$ | 140–143 |
| 6 | phenyl | —CH$_3$ | 207–210 |

TABLE II—Continued

| Method of Ex. | A | X—R | M.P., °C. |
|---|---|---|---|
| 6 | 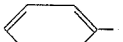 | —C$_2$H$_5$ | 153–156 |
| 6 |  | —O·C$_2$H$_4$·O·C$_2$H$_5$ | 131–133 |
| 6 | Cl—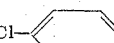 | —CH$_3$ | 263–265 |
| 6 | CH$_3$·O·C$_2$H$_4$·O—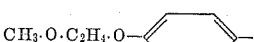 | —O·CH$_2$·CH$_2$CH$_3$ | 128–130 |

Example 20

62 g. 2-benzenesulfonamido-5-methoxyethoxypyrimidine are dissolved jointly with 8 g. sodium hydroxide in 250 ml. ethanol. The solution is evaporated to dryness, and the residue is suspended in 300 ml. acetone. The sodium salt of 2-benzenesulfonamido-5-methoxyethoxypyrimidine is filtered off, washed with acetone, and dried. The yield is about 60 g., the melting point 220–223° C.

The sodium salt of 2-(4-methylbenzenesulfonamido)-5-methoxypyrimidine is prepared in the same manner from the free compound. The salt melts at 273–275° C.

Example 21

61 g. 2-benzenesulfonamido-5-methoxyethoxypyrimidine are dissolved in a hot solution of 7.4 g. calcium hydroxide in 250 ml. water. The solution is filtered and evaporated to dryness in a vacuum. The residue is digested with 300 ml. acetone and filtered. The insoluble fraction is dried and consists of 60 g. of the calcium salt of 2 - benzenesulfonamido-5-methoxyethoxy-pyrimidine, melting at about 150° C.

Example 22

25 g. 2-benzenesulfonamido-5-methylpyrimidine are dissolved jointly with 15 g. ethanolamine in 300 ml. hot ethanol. A precipitate forms when the solution is permitted to cool. It is filtered off and washed with ethanol. After drying at about 50° C., 26 g. of the ethanolamine salt of 2-benzenesulfonamido-5-methylpyrimidine are obtained, having a melting point of 138–140° C.

Example 23

5 kg. 2-benzenesulfonamido-5-methylpyrimidine are worked into a paste according to conventional pharmaceutical procedures by mixing with an aqueous dispersion of polyvinylpyrrolidone and corn starch containing 0.1% of methyl p-methoxybenzoate or 0.1% of propyl p-methoxybenzoate as a preservative. The paste is dried and granulated. 80 g. talcum powder and additional corn starch are added to make the total weight 6.2 kg. The material is ready to be tabletted on conventional presses. Individual tablets each having a weight of 620 mg. and containing 500 mg. of the active sulfonamide material are pressed.

Example 24

The calcium salts of the sulfonamide compounds of our invention are readily soluble in water. For oral application of the sulfonamide compounds of our invention, we fill standard gelatine capsules (size 0) with the calcium salt of 2-benzene sulfonamido-5-methoxypyrimidine.

Example 25

10 kg. 2-benzenesulfonamido-5-n-propoxypyrimidine are micronized to a particle size of 5 to 10 microns. The fine powder is suspended by mechanical agitation is a carrier liquid of the following composition:

| | | |
|---|---|---|
| Distilled water | liters | 73 |
| Hydroxyethylcellulose | kg | 1.1 |
| Sorbic acid | g | 150 |
| Sodium lauryl sulfate | g | 50 |
| Fruit extract (flavoring) | kg | 1 |

The total volume is adjusted with distilled water to 100 liters (115 kg.). The liquid obtained contains in one teaspoonful (about 5 ml.) approximately 500 mg. of the active sulfonamide compound.

Example 26

If it is desired to apply the sulfonamide compounds of the invention externally, a solution may be prepared according to the following method:

21.46 g. 2-benzenesulfonamido-5-methoxy-ethoxypyrimidine sodium corresponding to 20 g. of the free sulfonamide compound are dissolved in 100 ml. distilled water. 1 ml. of the resulting solution contains 200 mg. of the active ingredient. The solution may be sterilized in the usual manner if this should be necessary.

It will be understood that Examples 20 and 21 are merely representative of methods for preparing salts of the sulfonamide compounds of the invention, and that the specific pyrimidine derivatives mentioned in the examples may be replaced by any one of the other pyrimidine derivatives disclosed. The potassium, lithium, ammonium salts are closely similar to the sodium salts and may be prepared by analogous methods. Equally, other physiologically tolerated amines may be substituted for the ethanolamine salt specifically mentioned in Example 22, and methylglucamine, morpholine, piperazine are additional examples of such organic bases. Where desired or necessary, the solubility of the sulfonamide compounds of the invention may also be increased by the admixture or joint application of bicarbonates or carbonates of the alkali metals or of ammonium in a manner well understood by those skilled in the art.

The potassium, strontium, and barium salts are readily prepared by the method of Example 20, but they are not of pharmacological interest. They may serve as intermediates in the production of salts with other bases, particularly organic bases.

The desirable pharmacological properties of the novel sulfonamide compounds of this invention will become more fully apparent from the Table II in which the median lethal dose $LD_{50}$ is listed for representative sulfonamide compounds of this invention together with the percentage reduction in blood sugar level produced.

The median lethal dose $LD_{50}$ was determined by intravenous injection in rats. The percentage reduction in blood sugar level was tested in fasting rabbits after oral ingestion of 500 mg./kg. of the active ingredient. For comparison purposes, the same tests were performed with N - (4 - methylbenzenesulfonyl) - N'-n-butylurea, a well-known blood sugar level depressant which is widely used in medicine.

The several sulfonamide compounds listed in Table II are again identified by the substituents A and B in Formula 1.

TABLE II

| | | $LD_{50}$ | Percent Blood Sugar Reduction |
|---|---|---|---|
| $N^1$-(4-methylbenzenesulfonyl)-$N^2$-n-butylurea | | 0.89 | 41 |
| A | B | | |
|  | —CH₃ | 1.2 | 44 |
|  | —O—CH₃ | 1.1 | 51 |
|  | —O—C₂H₅ | 0.95 | 42 |
|  | —O-n-C₃H₇ | 0.86 | 43 |
|  | —O—C₂H₄—O—CH₃ | 1.8 | 52 |
|  | —O—C₂H₄O—C₂H₅ | 2.7 | 49 |
|  | —O—CH₃ | 0.86 | 46 |
|  | —O—C₂H₄—O—CH₃ | 1.2 | 48 |
|  | —O—C₂H₄—O—CH₃ | 0.86 | 43 |
|  | —CH₃ | 1.0 | 45 |
|  | —CH₃ | 1.1 | 37 |
|  | —O.CH₂.CH(CH₃)CH₃ | 0.61 | 33 |
|  | —O-n-C₃H₇ | 0.77 | 24 |
|  | —O—CH₃ | 0.7 | 24 |
| n-C₄H₉ | —O—CH₃ | 1.2 | 47 |
| (CH₃)₂CH—CH₂—CH₂— | —O—CH₃ | 1.4 | 53 |
| CH₂=C(CH₃)—CH₂— | —O—C₂H₅ | 0.86 | 38 |
| C₂H₅—O—C₂H₄—O—C₂H₄— | —O—CH₃ | 5.5 | 30 |
| C₂H₅—O—C₂H₄—O—C₂H₄— | —O—C₂H₅ | 3.1 | 46 |
| C₂H₅—O—(C₂H₄—O)₂—C₂H₄— | —O—C₂H₅ | 4.3 | 35 |
| (CH₃)₂CH—O—C₂H₄—O—C₂H₄— | —O—CH₃ | 3.4 | 34 |
| —CH₂— | —O—CH₃ | 2.4 | 42 |

TABLE II—Continued

| A | B | LD$_{50}$ | Percent Blood Sugar Reduction |
|---|---|---|---|
| furfuryl (–CH$_2$– attached to furan ring) | –O–CH$_2$–CH(CH$_3$)$_2$ | 1.2 | 43 |
| N-(4-methylbenzenesulfonyl)-N'-n-butyl urea | | 0.89 | 41 |

It is seen that the sulfonamide compounds of the invention compare favorably with the known urea derivative in their effectiveness and their acute toxicity. The important ratio between the lethal dosis and the percentage reduction obtained by a fixed dosis is more desirable for most of the novel compounds than for the known product.

In a preparation intended for prolonged medication, the consequences of prolonged ingestion are important. Table III lists the results of autopsies performed on rats which had been given blood sugar depressants of this invention per os for four weeks in daily doses of 100 mg./kg. Ten rats were used in each test, and one group of ten rats was given N-(methylbenzenesulfonyl)-N'-n-butyl urea for the purpose of comparison.

The subacute toxicity of the compounds tested was evaluated from histological examination of the livers of the test animals.

TABLE III

| Compound | Number of rats with liver damage | Nature of pathological changes |
|---|---|---|
| N-(methylbenzenesulfonyl)-N'-n-butyl urea. | 4 | Major necroses and necrobioses. |
| 2-isoamylsulfonamido-5-methoxypyrimidine. | 5 | Minor necroses. |
| 2-benzenesulfonamido-5-n-propoxypyrimidine. | 1 | Minor degenerative liver changes. |
| 2-benzenesulfonamido-5-methylpyrimidine | 0 | No changes. |
| 2-benzenesulfonamido-5-methoxyethoxypyrimidine. | 0 | Do. |

The sulfonamides of the invention tested for subacute toxicity are better tolerated than the known compound which is in daily clinical use. The differences in toxicity between the tested compounds of our invention and the known compound are very substantial, particularly when it is considered that all the compounds of the invention listed in Table III have stronger blood sugar lowering effects than the known compound.

The salts of the sulfonamide compounds of our invention have the same physiological effects as equimolecular amounts of the free compounds. There is no detectable difference in activity between the free compounds and the several physiologically tolerated metal salts and salts of organic bases and of ammonium which are mentioned hereinabove. The effects of the sulfonamide compounds of the invention are not influenced by the usual carriers and adjuvants employed in pharmaceutical praxis. They are equally effective when orally ingested as powders, tablets, in dragees, capsules, pills, in suspensions or solutions, except for those delaying effects of the carrier which are obvious to those familiar with the art of pharmacy.

While the invention has been described with particular reference to specific embodiments, it is to be understood that it is not limited thereto, but is to be construed broadly and restricted solely by the scope of the appended claims.

We claim:

1. A sulfonamide compound of the formula

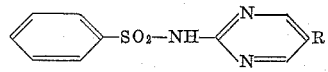

wherein R is a member consisting of lower alkyl and lower alkoxy-lower alkoxy.

2. A salt of a sulfonamide compound according to claim 1 with a physiologically tolerated base.
3. 2-benzenesulfonamido-5-methoxyethoxypyrimidine.
4. 2-benzenesulfonamido-5-methylpyrimidine.
5. 2-benzenesulfonamido-5-ethylpyrimidine.
6. 2-benzenesulfonamido-5-ethoxyethoxypyrimidine.
7. A sodium salt of the compound set forth in claim 3.

References Cited by the Examiner

UNITED STATES PATENTS

| | | | |
|---|---|---|---|
| 2,484,606 | 10/1949 | Braker | 260—239.75 |
| 2,519,314 | 8/1950 | Hultquist et al. | 260—256.5 |
| 2,529,840 | 11/1950 | Germann | 260—256.5 |
| 2,778,830 | 1/1957 | Pasedach et al. | 260—256.4 |
| 2,888,337 | 5/1959 | Chenicek | 44—63 |
| 2,938,903 | 5/1960 | Boyle | 260—256.4 |

OTHER REFERENCES

Northey, The Sulfonamides and Allied Compounds (New York, 1948), pages 14–15 and 18–19.

ALEX MAZEL, *Primary Examiner.*

DUVAL T. McCUTCHEN, IRVING MARCUS, *Examiners.*

ALTON D. ROLLINS, *Assistant Examiner.*